United States Patent
Pasch

(10) Patent No.: US 9,091,324 B2
(45) Date of Patent: Jul. 28, 2015

(54) POWER TRANSMISSION BELT AND METHOD OF MAKING SAME

(71) Applicant: Lambert Pasch, Roetgen (DE)

(72) Inventor: Lambert Pasch, Roetgen (DE)

(73) Assignee: Gates Corporation, Denver, CO (US)

( * ) Notice: Subject to any disclaimer, the term of this patent is extended or adjusted under 35 U.S.C. 154(b) by 242 days.

(21) Appl. No.: 13/867,227

(22) Filed: Apr. 22, 2013

(65) Prior Publication Data

US 2013/0237356 A1 Sep. 12, 2013

Related U.S. Application Data

(62) Division of application No. 12/887,503, filed on Sep. 21, 2010, now Pat. No. 8,454,464.

(51) Int. Cl.

| | |
|---|---|
| F16G 5/00 | (2006.01) |
| B29C 53/78 | (2006.01) |
| B32B 37/00 | (2006.01) |
| F16G 1/04 | (2006.01) |
| F16G 1/10 | (2006.01) |
| B29D 29/08 | (2006.01) |
| F16G 1/08 | (2006.01) |
| F16G 1/28 | (2006.01) |
| B32B 5/02 | (2006.01) |
| B32B 3/28 | (2006.01) |

(52) U.S. Cl.
CPC *F16G 1/04* (2013.01); *B29D 29/08* (2013.01); *B32B 3/28* (2013.01); *B32B 5/022* (2013.01); *B32B 5/024* (2013.01); *B32B 5/026* (2013.01); *F16G 1/08* (2013.01); *F16G 1/10* (2013.01); *F16G 1/28* (2013.01); *B32B 2413/00* (2013.01)

(58) Field of Classification Search
CPC ............ F16G 1/04; F16G 1/10; F16G 1/26; F16G 3/10; Y10T 428/2925
USPC ............... 156/141, 195; 264/172.19
See application file for complete search history.

(56) References Cited

U.S. PATENT DOCUMENTS

| | | | | |
|---|---|---|---|---|
| 1,483,578 | A * | 2/1924 | Goodbar | 474/262 |
| 1,579,946 | A * | 4/1926 | Kepler | 474/254 |
| 1,958,069 | A * | 5/1934 | Sadler | 474/259 |
| 2,543,903 | A * | 3/1951 | Elvin et al. | 474/258 |
| 3,031,364 | A * | 4/1962 | Perkins | 156/137 |
| 3,673,024 | A * | 6/1972 | Eriksson | 156/137 |
| 4,541,823 | A * | 9/1985 | Marsh et al. | 474/205 |
| 4,626,232 | A * | 12/1986 | Witt | 474/205 |
| 5,392,831 | A * | 2/1995 | Thomas et al. | 156/138 |
| 5,837,085 | A * | 11/1998 | Chen et al. | 156/138 |

FOREIGN PATENT DOCUMENTS

JP  2001090784 A * 4/2001 ............ F16G 1/28

OTHER PUBLICATIONS

JP2001090784 English Translation.*

* cited by examiner

*Primary Examiner* — William E Dondero
*Assistant Examiner* — Minh Truong
(74) *Attorney, Agent, or Firm* — Paul N. Dunlap, Esq.; Jeffrey A. Thurnau, Esq.

(57) ABSTRACT

A method of making a belt including the steps of: (a) helically wrapping a fabric strip of predetermined width on a mandrel at a first helix angle; (b) helically winding a tensile cord onto the mandrel over the fabric at a second helix angle less than the first helix angle; (c) wrapping a sheet or a strip of elastomer material around the mandrel over the tensile cord; and (d) curing the elastomer material under pressure to form a belt sleeve. The mandrel may be grooved for making toothed belts. The fabric strip may be preformed. A resulting toothed belt has a fabric seam spanning several teeth and having a helix angle. The seam may be joined.

18 Claims, 4 Drawing Sheets

POWER TRANSMISSION BELT AND METHOD OF MAKING SAME

BACKGROUND OF THE INVENTION

1. Field of the Invention

This invention relates generally to an endless power transmission belt with wear-protecting reinforcing fabric or jacket on at least one surface, more particularly to an endless toothed belt with a fabric on the tooth side which has a seam extending over more than two teeth, and to a method of making the same involving helically-wrapping a continuous fabric strip.

2. Description of the Prior Art

Representative of the art of toothed power transmission belts and methods of making the same is U.S. Pat. No. 4,235,119 to Wetzel. Wetzel discloses three known methods of manufacturing toothed belts including the extruded tooth method, the tooth preform method and the flow through method. All methods disclosed therein use a sheet of fabric wrapped on a mandrel (i.e., a grooved cylindrical mold) with the ends of the fabric sewn together or otherwise united in a butt joint or lap joint, whether the fabric is square woven, bias-cut, stress-relieved, or stretchable. The sewn fabric sleeve or tube is often called a "jacket" and the joint may be called a "splice." The butt joint is preferably (according to Wetzel) located over the ridges between the grooves in the outer circumference of the mold. As illustrated in FIG. 1, the jacket becomes the tooth cover 12 for the teeth 18 in the finished belt 10, with the butt joint 15 located preferably (according to Wetzel) in a land region 19 of the belt, i.e. the thin section between two teeth. Belt 10 also generally includes one or more tensile cord 16 spirally wound and elastomeric belt body 14 which fills out the teeth and surrounds the tensile cord. The flow through method includes placing the fabric tube on the mandrel, spirally wrapping the cord onto the fabric, wrapping a layer of rubber onto the cord layer, then curing under pressure so that the rubber flows between adjacent cords to fill out the teeth, pressing the fabric into the mandrel grooves. Joining or uniting the fabric ends is necessary so that the jacket stays in place on the mandrel during the cord winding step, which generates centrifugal forces that can cause the jacket to expand.

Also representative of the art of toothed power transmission belts and methods of making the same is U.S. Pat. No. 3,756,091 to Miller. Miller discloses that there is a tendency for those splices of the jacket which lie entirely in the root and land area of a belt tooth to break in use caused by the reduced strength of the jacket. To eliminate this problem, Miller teaches, as illustrated by belt 20 in FIG. 2, that the jacket 12 should be bias cut so that the minimum angle that splice 25 makes with the belt side is such that if the splice starts at the point where the root 22 of a tooth 18 blends with its land area 19 it will end, when viewed in cross section, at the equivalent blend point on the other side of the same tooth, and preferably, as shown, the splice 25 is at such an angle that the splice spans two teeth 18.

Herein, the sewn fabric splices illustrated in FIGS. 1 and 2 will be referred to as "transverse" and "bias" splices or joints, respectively. A transverse splice runs from one side of the belt to the other side of the belt generally within the space of a single tooth pitch, although it may wander more than that if not carefully aligned during building. The bias splice of FIG. 2 typically might make an angle with the belt edge of about 45° and span one or two tooth pitches. Conventional splice joining methods for a sheet of fabric include sewing, fusing, laminating, bonding, and the like, and the joining step can be difficult to carry out without folds, gaps, or other potential defects. These splices are generally considered weaker than the rest of the fabric, and the tooth or land in which the joint resides may be the weakest portion of the belt to certain stresses. The bias splice and transverse splice can both also result in a lot of wasted material. Splicing also is a labor intensive operation. It is currently generally preferred in the art to have a transverse jacket splice which is located in and follows along the tip of a single tooth (contrary to Wetzel's teaching mentioned above). Such splice location is difficult in practice.

U.S. Pat. No. 4,395,298 to Wetzel, et al., U.S. Pat. No. 4,444,621 to Marsh, et al., and U.S. Pat. No. 5,421,927 to Macchiarulo, et al., disclose methods for making long length toothed belts based on first forming a tubular sleeve comprising cover fabric, helically wrapped tensile cord, and elastomeric belt body material, then spirally cutting the sleeve to make a continuous strip of toothed-belt material, helically wrapping the strip around two wrapping drums which align the teeth and control the belt length, and fusing the adjacent loops of helically wrapped strip to form a new, longer belt or tubular sleeve. As a result of this helical cutting and wrapping process, the toothed belt exhibits a cover fabric structured in the form of a narrow continuous strip forming loops disposed in side-by-side relation and mating at the respective opposite edges. Marsh, et al., teaches that the helix angle of the spiral cut should be in the approximate range of 0.1 to 0.5 degrees, to provide a strip width in the approximate range 5 to 20 mm. The cutting angle is approximately equal to the helical angle of the tensile cords. This small angle is necessary to prevent or minimize cutting of the cords, which would reduce the tensile strength of the resulting belt.

SUMMARY

The present invention is directed to systems and methods which provide an endless power transmission belt with a fabric strip covering the surface which is in contact with the pulley in which there is a helical seam extending over more than two teeth and with the strip width preferably equal to or greater than the belt width. Thus, the belt need have no transverse- or bias-oriented fabric splice, eliminating the issues surrounding conventional splice location.

The invention also relates to a method, process and materials for manufacturing an improved toothed belt having a fabric on the tooth profile, tensile cord reinforcement and elastomeric belt body.

The invention relates to the use of a continuous, fabric strip helically wrapped around the profile mandrel (cylindrical grooved mold) in single ply or overlapping manner. The strip may be preformed to fit the profile of the mandrel. Thus, the seam is distributed over more than two teeth, or over several or many teeth, thus avoiding the weakening of the tooth shear strength of any one tooth. Moreover, the construction method permits the splice helix angle to be independent of that of the tensile cord. In addition, this invention may reduce the cost for preparing the fabric as a tooth cover and reduce the number of steps required in making the toothed belt.

The invention relates to a belt having an elastomeric belt body, a helically wrapped fabric strip covering a belt surface with adjacent edges of the fabric strip describing a helical seam which extends over more than two belt teeth, or at least over three or more tooth pitches. The seam is preferably not overlapped, just butted. The seam may make a first helix angle relative to a side edge of the belt. There may be a helically wrapped tensile cord embedded in the belt body with the tensile cord describing a second helix angle relative to a side edge of the belt, with the first helix angle greater than the second helix angle. The first helix angle may be greater than the second helix angle by a factor of at least about two. The tensile cord lies in a single plane, i.e., constant radial distance from the belt center. The belt may be in the form of a toothed belt with the fabric strip covering the tooth profile surface of the belt. The seam helix angle may be in the range of about 1.5 degrees to about 19 or 20 degrees.

The fabric may be a stretch fabric or semi-stretch fabric. The fabric strip may have a width equal to or greater than the width of the finished belt, or in the range of at least about two times the width of the finished belt, or from about one to four times the width of the finished belt. The seam may advantageously extend helically from one fourth to once around the circumference of the belt.

The invention is also directed to a method of making a belt including the steps of: (a) helically wrapping a fabric strip of predetermined width on a mandrel at a first helix angle; (b) helically winding a tensile cord onto the mandrel over the fabric at a second helix angle less than the first helix angle; (c) wrapping a sheet of elastomer material around the mandrel over the tensile cord; and (d) curing the elastomer material under pressure to form a belt sleeve with teeth. The fabric strip may be a treated fabric. The fabric strip may be preformed and the mandrel grooved, resulting in a toothed belt sleeve. The belt sleeve may be cut into individual belts which may be further processed, for example, by grinding, printing, trimming, etc.

The method may include preforming the fabric strip so that teeth corrugations are oriented at a tooth angle with respect to an edge of the fabric strip, and the tooth angle may be complementary to the first helix angle. The fabric strip may have a width equal to or greater than the width of the finished belt, or in the range of about one to four times the width of the finished belt.

According to an embodiment of the invention, the fabric strip may be helically joined to form a helically spliced jacket. According to an embodiment of the invention, the method of making the belt may include continuously joining, for example by sewing, gluing or welding, the edges of the fabric strip as it is helically wound to form a tubular sleeve or jacket. The method may include treating, drying, and the like.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The accompanying drawings, which are incorporated in and form part of the specification in which like numerals designate like parts, illustrate embodiments of the present invention and together with the description, serve to explain the principles of the invention. In the drawings.

DETAILED DESCRIPTION

Figure 1:
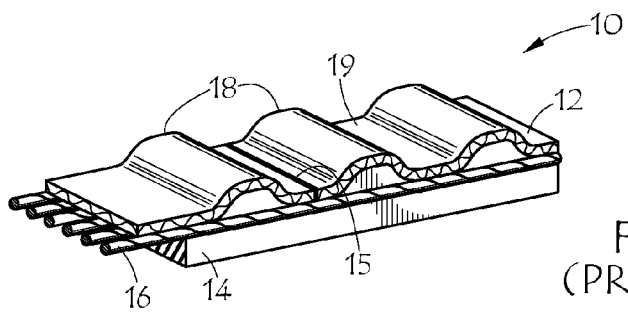
FIG. 1 is a partially fragmented perspective view of a prior art toothed belt.
Figure 2:
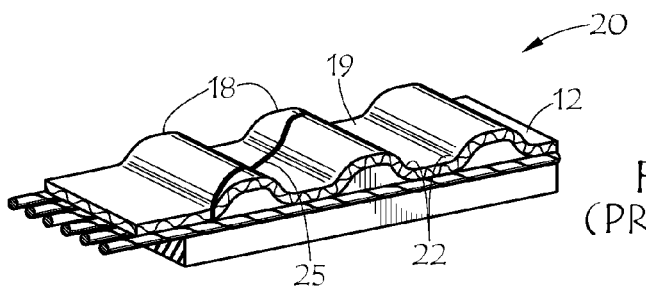
FIG. 2 is a partially fragmented perspective view of another prior art toothed belt.
Figure 3:
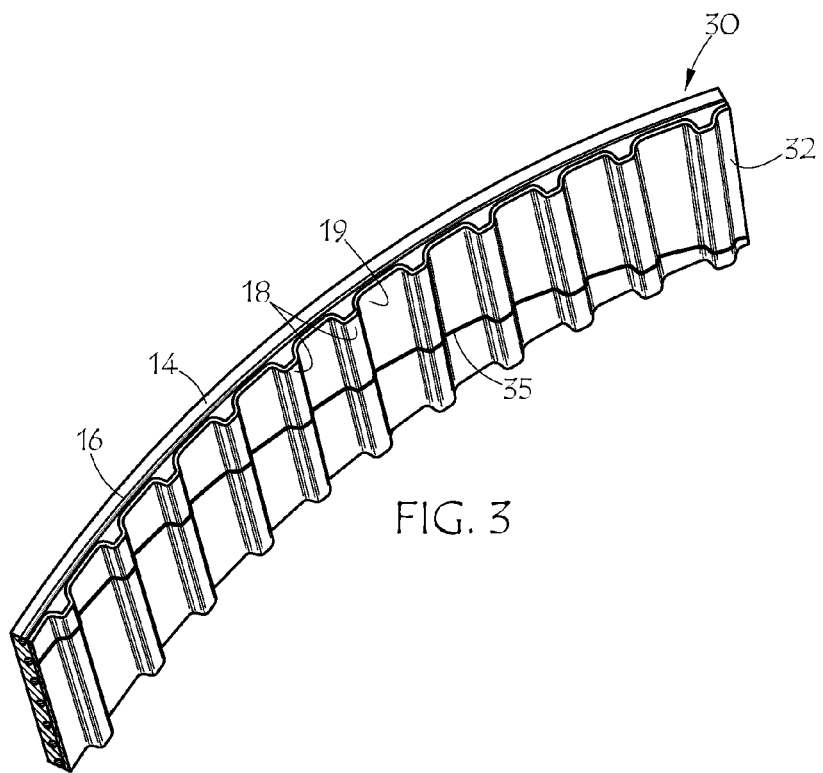
FIG. 3 is a partially fragmented perspective view of a toothed belt according to an embodiment of the invention.

FIG. 3 shows a toothed belt according to an embodiment of the invention. Belt 30 has an elastomeric belt body 14 with teeth 18 on one side. Embedded in belt body 14 is a tensile layer of spirally wrapped tensile cord 16. Tooth cover 32 is a strip of reinforcing fabric helically wrapped around the belt and covering the tooth profile surface of the belt. As a result of the process of wrapping the fabric strip, tooth cover 32 has seam 35 extending longitudinally, or substantially longitudinally, in the belt circumferential direction, across many teeth, and at a helix angle with respect to a side edge of the belt. Seam 35 is preferably a butt joint, but it could instead be a lap joint provided the lap is half the width of the fabric strip. If the lap less than half the width, there will be sections having only one layer of fabric under the cord line, resulting in some cords being at lower plane than others. If the lap is more than half the width, there will be sections with three layers of fabric and portions of the cord on a higher plane than others. Preferably the cord is uniformly located all in the same plane in any cross sectional view of the belt. Seam 35 as shown spans more than the eleven teeth shown in FIG. 3. By "seam" is meant the line where the edges of two sections of fabric join or meet. A seam need not be sewn or welded, but may simply be held by the material forming the body of the belt. A seam may be "open" somewhat exposing some of the tooth elastomer to view. An open seam may, for example, be open up to one or two mm without detriment to the belt performance.

The tooth cover 32 according to the invention is a continuous strip of fabric. Any type of fabric suitable for covering a belt surface may be used. For example, the fabric may be a woven, a non-woven, a knit, or the like. The fibers of the fabric may be synthetic or natural or blends, including for example, nylon, polyester, acrylic, cotton, aramid, PEEK, or the like. The fabric may be treated in any way suitable for treating tooth covering fabrics. For example, the fabric may be coated with an adhesive composition such as an RFL (resorcinol-formaldehyde-latex formulation), a rubber cement, or the like. The fabric may be further coated on one or more sides with other coatings for various purposes, such as friction modifying materials, rubber layers, or the like. The fabric may comprise a lamination of a layer of thermoplastic film on one side of a fabric. The term "fabric" is used herein to refer to a fabric whether so-treated or not, provided it is made ready for use in a belt manufacturing process.

By continuous strip is meant a piece of fabric that is very much longer than its width. Preferably it is at least long enough to completely cover a belt mold when spirally wrapped thereon. Preferably it is of a predetermined width which is chosen to provide a predetermined helix angle when spirally wrapped on a belt mold. The helix angle of the fabric strip is a function of the width and the mold (or belt) diameter (or circumference). Preferably the predetermined width of the strip provides for a helix angle that is greater than the helix angle of the subsequently spiraled-on tensile cord, for example, more than twice the helix angle of the cord, or equivalently, the width of the strip may be more than twice the width of the cord. If two cords (e.g. S and Z twisted cords) are spiraled on side by side, it is preferable that the helix angle of the strip be more than twice the helix angle of a cord, or that the width of the strip be more than four times the width of a cord. Thus, the longitudinal sheer plane of the seam will not align with that of the tensile cord layer, preventing any new weakness along the length of the belt.

Preferably the width of the fabric strip is wider than the finished belt width, so that no more than one longitudinal seam will be located across the width of the belt at any location in the belt. According to an embodiment of the invention, the fabric strip may have a predetermined width equal to or greater than the width of the finished belt, or in the range of about one to four or five times the width of the finished belt, or from one to three times the width of the belt, or about twice the width of the belt. According to another embodiment of the invention, the width of the strip may provide for a seam helix angle relative to the belt edge in the range of from 1.5 degrees to about 20 degrees, or from 2 to 18 degrees. Preferably the helical fabric seam spans more than two teeth, for example more than four teeth, or preferably more than six or eight teeth. Preferably the helical jacket splice does not extend more than once around the belt circumference. Preferably the helical fabric splice may extend around the belt in the range from about one fourth to about one half the belt circumference. If the fabric width is less than the width of the belt, there will be a seam extending more than once around the belt circumference, which could result in a weakening of the belt. Also, if the fabric width is less than the width of the belt, more wraps are required to cover the mold than with wider strips, resulting in longer process times than desirable.

Figure 7:
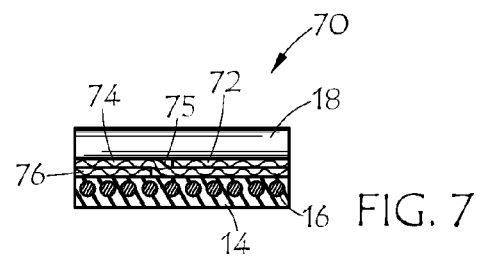
FIG. 7 shows a transverse section view of a toothed belt according to another embodiment of the invention.

FIG. 7 shows another embodiment of the invention having two layers of fabric and a single spiral splice. Thus, in FIG. 7, belt 70, having elastomeric body 14 with teeth 18 and embedded tensile cord 16, has splice 75 involving two layers of jacket. As before, the jacket is a continuous strip that is helically wrapped or spiraled onto a belt mold. However, the spirals overlap about half the width of the strip, so that one spiral layer of fabric 76, has second spiral of fabric 74 partially overlapping layer 76 and partially forming an adjacent first layer of fabric which is in turn overlapped by the next spiral layer 72. In a conventional process with more than one sheet of fabric with ends joined across the mold face, there will be a transverse splice for each layer of fabric. Care is usually taken to ensure that the two splices are staggered. The two-layer embodiment of FIG. 7 only has one seam 75, with the advantages resulting from being spread across multiple teeth and along the length of the belt instead of transverse. Overlapping the spirals about half the fabric strip width provides a most uniform two-layer fabric cover and provides a uniform support for the cord.

Whether one or two layers of fabric are used in the belt, it is preferable that the resulting jacket layers are of uniform thickness to support the cord layer at a uniform position in the belt. In other words, the seam should either be a butt joint without any overlap or be overlapped half the fabric strip width to provide a uniform double layer of fabric as illustrated in FIG. 7. Thus, the cord centerlines should be collinear when viewed in section as in FIG. 7, with no cords higher or lower than any other cords. In terms of the cord winding on the mandrel, the cords should be at a constant and uniform radius from the center of the belt or mandrel.

Conventional toothed belts have typically a sheet of fabric on the tooth profile to reinforce the tooth and protect against wear. These fabrics are designed with a stretch in the range of 30% to 80% or even more in the circumferential direction of the belts. The stretch is needed for processing reasons to allow forming of the teeth with the elastomeric material, for example in the conventional flow-through process. Alternative methods use a preformed sheet of fabric with a low-stretch or semi-stretch fabric, i.e. less than 30% stretch or less than enough stretch to go from a circle on a mold to following the tooth profile. In both cases, the preparation of the fabric as a sheet the full width of the mold or mandrel prior to the molding process is time consuming and results in material waste. Also, the conventional methods result in a fabric splice that is essentially parallel to the belt teeth and may sometimes be considered a weak point in the product which can limit its service life and may provide a source of undesired noise.

On the other hand, embodiments of the present invention include the use of a continuous preformed fabric strip wrapped around the profile mandrel in a single ply. Thus, the present invention provides an approximately longitudinal seam which spans many teeth, but represents a minimal disruption to the surface of any one tooth. Therefore the inventive belt splice does not provide a localized noise source, or a weakened tooth. In addition, the cost for preparing the fabric as a jacket may be reduced, and the steps in making the toothed belt may be reduced or made easier to carry out.

The elastomer may be any suitable elastomer for forming a belt body. For example, the elastomer may be rubber, thermoplastic elastomer, thermoplastic polyurethane, cast polyurethane, or the like. Rubber elastomers may be based on any suitable rubber composition, such as styrene-butadiene rubber (SBR), polychloroprene, natural rubber, nitrile rubber (NBR), hydrogenated NBR or SBR, ethylene-alpha-olefin elastomers, acrylic elastomers, butyl, ethylene vinyl-acetate elastomers, and the like, and blends thereof. Any suitable combination of ingredients may be included in the elastomer, such as curatives, extending fillers and oils, reinforcing fillers and fibers, process aids, antidegradants, plasticizers, and the like. An advantage of the present invention is that elastomers of different types and/or properties may be plied up with greater control and variety than in the conventional flow-through process. Thus, for example, the belt body may include one type of elastomer in the preformed tooth, and/or another elastomer composition around the tensile cord, and/or another elastomer composition over the cord on the back of the belt. A second fabric or jacket could also be applied to the back side of the belt, either by helical wrapping a strip of fabric as described herein, or using a sheet of fabric.

The cord may be any suitable tensile cord for toothed belt reinforcement. For example, the cord may comprise fibers of glass, aramid, carbon, polybenzobisoxazole (PBO), polyketone, boron, metal wire, or the like, or combinations thereof. The cords may be of any suitable construction, such as twisted, folded, cabled, core-sheath, or the like. Two cords constructed of opposite twist may be used, spiraled in the belt side by side, resulting in alternating cords of opposite twist. The cords may include one or more adhesive or protective treatments, such as primers, dips, RFL, overcoats, rubber cements, or the like. An advantage of the present invention is that the cord spacing may be reduced compared to the conventional flow-through process.

The tooth profile may be any suitable tooth profile. For example, the tooth profile may be trapezoidal, curvilinear, truncated curvilinear, or the like.

Figure 4:
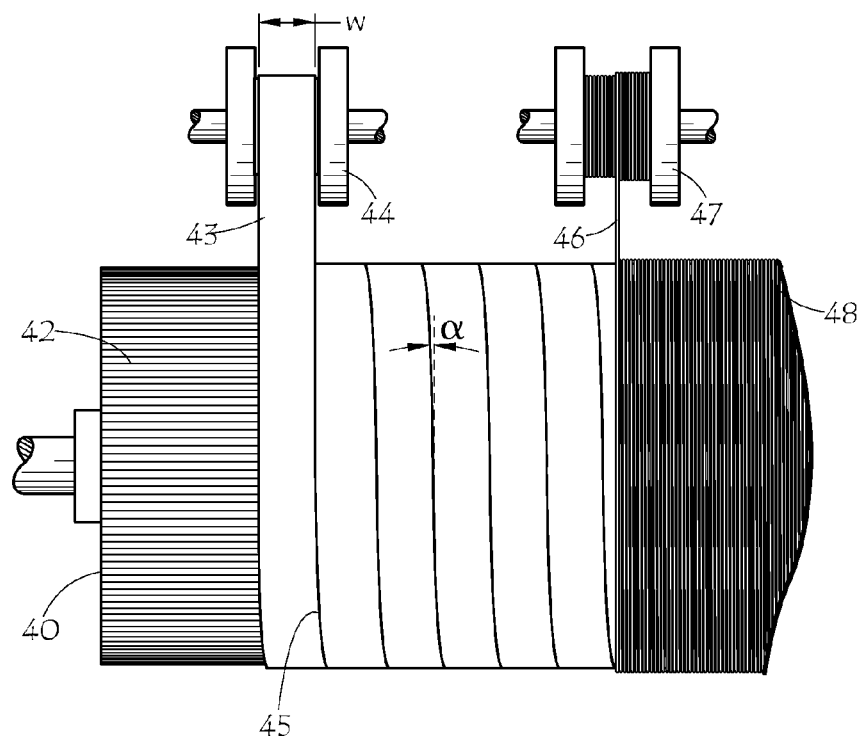
FIG. 4 shows process steps according to an embodiment of the invention.

The invention also relates to a method for manufacturing endless belts having a fabric on an external surface. The method is particularly useful for making toothed belts having a fabric covering the tooth profile surface. FIG. 4 illustrates key steps in the manufacture of toothed belts according to an embodiment of the invention. FIG. 4 shows mandrel 40 with grooves 42 shaped to produce a desired tooth profile. Fabric strip 43 of width "w" is shown being spiraled onto mandrel 40 from right to left at helical angle "α". Fabric let off 44 is representative of any suitable apparatus for applying the fabric strip at an appropriate feed rate, tension, cross head speed, etc., as the mandrel rotates. The spiraling of fabric 43 results in helical seam 45. In FIG. 4, the fabric is applied so that each subsequent loop of fabric butts against the previous loop, forming a helical butt splice. In other embodiments, the wrapping process may overlap the fabric half its width to form a double layered jacket in the belt, as illustrated in FIG. 7. The strip width must be less than the face width of the mandrel in order to consider the strip to be spiraled onto the mandrel and to avoid fabric waste. Preferably the fabric strip is wrapped around the mandrel a plurality of times, although the number of wraps will depend on the mandrel width and the strip width. The preferred fabric dimensions and helical angles discussed above apply here as well.

After fabric strip 43 is applied to the mandrel, FIG. 4 shows tensile cord 46 being spiraled from a cord let off 47 onto the mandrel, again from right to left. Thus, cord layer 48 may be formed on top of the fabric layer. Instead, the cord could be applied from left to right, or in the opposite direction as the fabric spiral. A pair of cords of equal and opposite twist may be used instead of a single cord. A plurality of cords may likewise be applied. Since the cord is much thinner than the fabric width, the helical angle of the cord will be much less than that of the fabric, preferably less than half of α. A layer of elastomer could be applied over the fabric before winding on the cord, either as a butt joined sheet or as a spiraled strip.

After cord layer 48 has been applied, a layer of elastomeric material is wrapped around the cord layer, either as a butt-joined sheet or as a spiraled strip. Multiple elastomer layers could be applied, for example, an adhesion layer next to the cord and another layer for the backside of the belt. The material may then be cured in any suitable vulcanization or cure process, typically under heat and pressure. The pressure forces air out from between the cords and layers and forces the elastomer into the spaces between and around the cords. The resulting tubular object is often referred to as a sleeve of belts or a belt sleeve. The belt sleeve may be further processed in any way desired, including, for example, one or more of cutting a number of individual endless belts therefrom, applying or printing a label, trimming an edge, grinding to a desired belt thickness, and the like.

Preferably, fabric strip 43 may be preformed to the general shape of the mandrel grooves before the strip is spiraled onto the mandrel. Preforming has a number of advantages. The preformed strip, which follows closely the contour of the mold, is less prone to rubber or elastomer flowing through the splice during the curing or molding of the elastomer belt body. Preformed jacket can utilize a wider variety of fabrics, including for example, non-stretch or semi-stretch fabrics. Fabrics with less stretch than required for the conventional flow through process may offer better tooth reinforcement, and may be more economical, for example. Conventional methods utilizing preformed sheets of fabric are complicated by the need to join the edges to make a jacket. With a preformed strip, no edge joining is needed.

Any suitable fabric preforming process may be used to preform the fabric strip. One method of preforming may be carried out directly on the mold or mandrel. The fabric strips may be wound directly onto the mold using a profiled roll which pushes the fabric into the tooth-forming grooves of the mandrel. The fabric may be held in place on the mold with a temporary adhesive, or by fixing the fabric strip in the preformed condition with one or more thin yarns or retaining threads wound or spiraled on the outside of the strip during the strip winding operation. The thin yarns may be left in place or removed as the cord is spiraled onto the mold. In addition or instead, elastomer tooth material may be forced into the tooth-forming grooves to hold the fabric shape. Any suitable tooth elastomer material may be used, and it may be different from or the same as the belt body elastomer.

Figure 6:
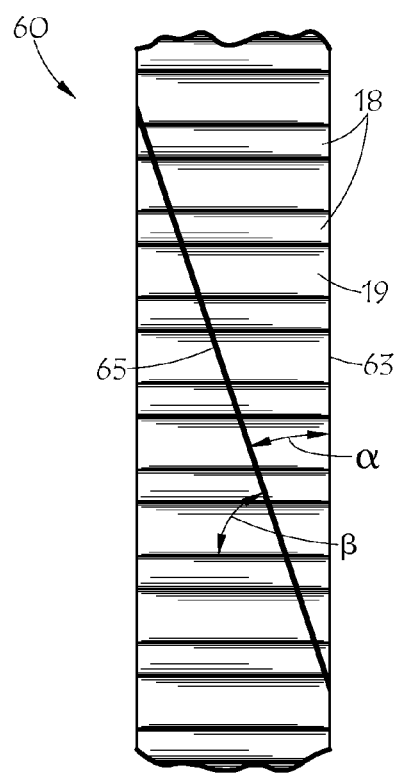
FIG. 6 shows a partial plan view of a toothed belt according to an embodiment of the invention.
Figure 5:
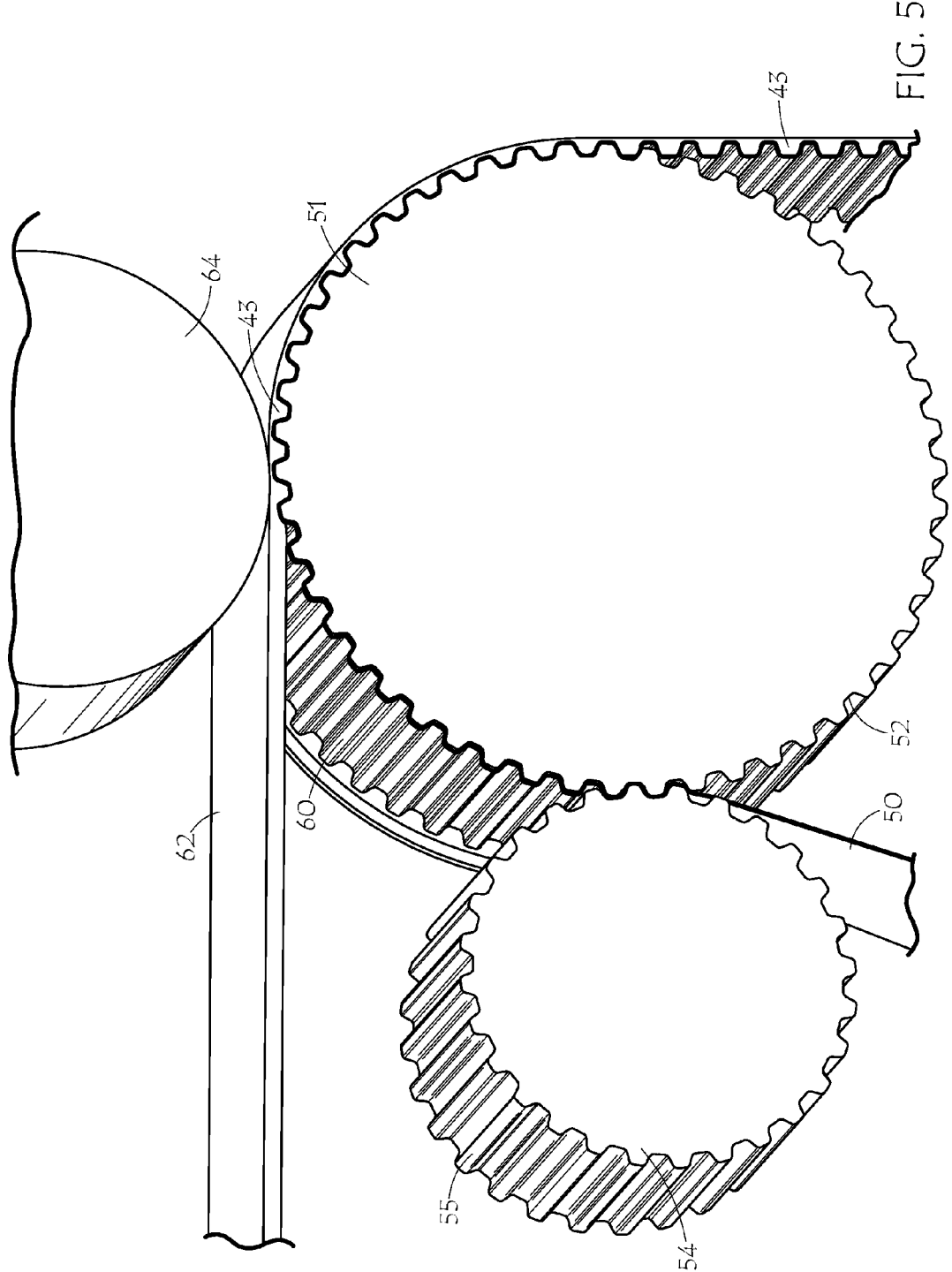
FIG. 5 shows an apparatus used in a processing step according to an embodiment of the invention.

Another method of preforming the fabric strip is illustrated in FIG. 5. Fabric strip 50 is first fed between two profiled rolls 51 and 54. Secondary profile roll 54 has teeth 55 which push fabric strip 50 into tooth-forming grooves 52 of primary roll 51. The fabric strip is thus made a corrugated strip 60, which might then be used on the mandrel for building belts. Preferably, an additional operation is applied to the corrugated strip to improve retention of the corrugated shape during winding onto the mandrel. One alternative is to apply a formable elastomer to fill the tooth corrugations of the fabric strip. FIG. 5 shows elastomer strip 62 fed between press roll 64 and primary roll 51 to make preformed fabric strip 43. Elastomer strip 62 may be any suitable elastomer material as described above for the belt body, including the same or a different material as used for the belt back side in a subsequent belt molding step. Also, the two profile rolls 51 and 54 may have grooves of such size and pitch and with a groove helix angle adequate to produce a tooth helix angle in the preformed profile, matching exactly and being parallel to the profile of the molding mandrel. In this case the angle of the teeth on the preformed strip with respect to the edge of the strip is complementary to the helix angle of the strip itself when wrapped onto the mandrel. By complementary is meant the two angles together make a right angle. FIG. 6 illustrates toothed belt 60 with alternating teeth 18 and lands 19 and fabric seam 65 oriented at an angle, α, with respect to side edge 63. Seam 65 is also oriented at an angle, β, with respect to teeth 18. Angles α and β are complementary. Seam 65 spans about seven belt teeth in FIG. 6.

The invention can improve a toothed belt in a number of aspects. The fabric seam is at least distributed over many teeth, which eliminates the weak spot caused by a typical splice being parallel to the tooth or over just two teeth. The seam on the inventive belt is approximately parallel to the usual stresses on the belt teeth, so that the stresses do not tend to open up the seam.

The preforming operation allows the use of different elastomeric materials for the tooth profile and for the backside of the belt. A harder tooth material can improve the load capability whereas the backside material may be softer to reduce noise or optimize the desired friction characteristics. In addition, preforming allows the option of adding a layer of elastomer and/or fibrous material over the fabric and under the cord, for example, to adjust the cord pitch line, enhance adhesion, and the like. Unlike prior preform processes, the inventive process can completely fill the tooth with rubber, or overfill the tooth with rubber to support the cord evenly all around the mandrel, including over the grooves.

The preforming of the teeth avoids the conventional flow-through process of toothed belt manufacture. Choice of tooth material in that process is limited because the material needs good flow properties to get through the cord layer and because of the need to prevent wiping off of the adhesion coating on the tension members. The flow-through method also requires a certain proportion of gaps between the tension members, restricting the number of tension members. As the product made by the invention does not need the flow-through, the belt can have more tension members per unit width allowing a narrower belt to have the same strength.

The continuous fabric strip can be woven or knit to the desired predetermined width, avoiding trim waste and allowing fabric constructions of significantly higher strength, improved wear and noise characteristics and flexibility. The fabric strip can be applied in the weave direction, i.e. with the weave direction oriented around the belt. Conventional techniques with sheet fabric generally require the fabric width direction oriented around the belt, requiring the fabric to be cut and rotated, often with more than one splice.

In the flow-through process, the rubber may distort the cords during flow, in particular by pushing the cord segments which span a mold groove down somewhat into the groove. This may result in poor dimensional stability and/or local flex fatigue problems in the cord. By preforming the fabric and filling or even overfilling the tooth profile of the fabric with elastomer material, the cord can be given support across the mold grooves during cord winding, resulting in a more circular cord path, better length stability, and/or improved flex fatigue. Thus, preformed fabric can insure that the tension member is not deflected between the teeth during cord winding (a chordal effect that results in a cord bend radius smaller than the mold radius) thus avoiding damage to the tension members and improving the belt elongation characteristics resulting in improved length stability. In other words by preforming the jacket strip with elastomer filling the teeth, according to an embodiment of the invention, the cord can be supported on the entire circumference of the grooved mold during cord winding, an ideal cord winding situation.

Figure 8:
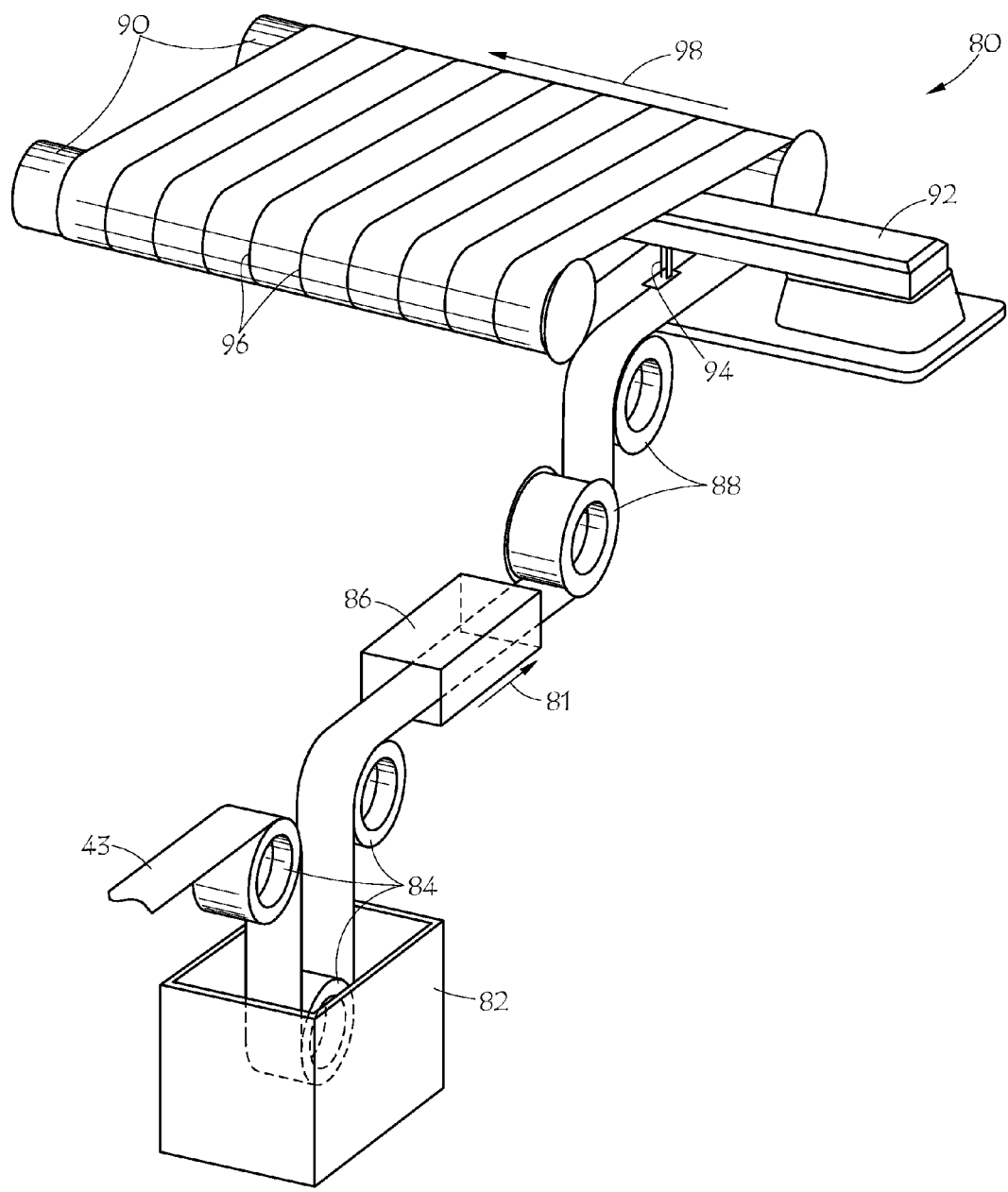
FIG. 8 shows process steps and apparatus according to another embodiment of the invention.

According to another embodiment of the invention, the helical "seam" where the edges of two sections of fabric join or meet may be joined, for example by sewing, gluing, fusing, taping or welding. A loosely sewn seam may be "open" somewhat, exposing some of the tooth elastomer to view. FIG. 8 illustrates apparatus and process 80 for joining a treated fabric strip in a helical manner to form a fabric sleeve. In FIG. 8, fabric strip 43 is fed in the direction indicated by arrow 81 through an optional fabric treatment dip tank 82. Dip tank 82 and guide rolls 84 are shown for illustrative purposes only, and may be any appropriate combination of treating apparatus, for example rollers, squeeze rolls, wipers, sprayers and the like may used to treat the fabric, including multiple treatment stages, such as primer, RFL, final coat, and the like. Treated fabric may then be passed through a suitable drying stage or dryer, such as oven 86 in FIG. 8. Any suitable treatment may be used as described previously. Fabric strip 43 may then be fed over suitable guide rolls 88 onto guide bars 90 where the fabric is helically wrapped with edges abutting in to form helical seam 96. Seam 96 is joined by joining machine 92, which is illustrated as a sewing machine with foot 94. The joining machine may operate on the top or the bottom portion of the sleeve, or from the inside or outside of the sleeve. The joining machine may utilize any suitable joining method, such as ultrasonic welding, thermal welding, laser welding, gluing, sewing, stitching, use of reinforcing fabric tape, or adhesive film, or other suitable joining material, or the like, to seal and reinforce the seam. The strip is joined continuously as it is fed onto the guide bars resulting in a tubular fabric sleeve growing lengthwise in the direction of arrow 98.

Although joining machine 92 is shown stitching the seam from the inside and bottom of the sleeve as a nonlimiting example, it should be understood that the stitching, welding, or joining could be from the top or outside of the tube, or any other suitable configuration for the process used to join the seam. The tube may be cut in lengths to make a helically spliced jacket to fit a mold or mandrel such as mandrel 40. The jacket may be of stretch fabric, applied to a mandrel for building a belt sleeve according to the flow-through method or other known belt-making method using spliced jackets. The advantages of this method over conventional transverse-splice methods include that the helical splice requires no special care to locate it, the cutting of the jacket involves almost no material waste, the width of the fabric strip is used as-woven without cutting, a number of conventional jacket process steps may be eliminated and/or combined into a single continuous operation for time, labor and cost savings, and the like. The guide bars 90 may have adjustable spacing for making helically spliced jackets of any desired circumference. Guide bars 90 may be cylindrical and may, but need not, rotate.

The helically joined jacket may be of a stretch fabric for tooth formation by the flow through process of toothed belt making Alternately, the fabric may be stretch or semi-stretch and the teeth may be preformed as the jacket is applied to the mandrel. Preforming may use any suitable technique or combination of techniques, including pleating or forming by means of toothed wheels, vacuum forming, retaining threads, inserting tooth rubber, and the like. The jacket sleeve may be made larger than the mandrel to accommodate formation of the tooth profile on the mandrel within the stretch limitations of the fabric.

It should be understood that, in addition to endless toothed belts, this invention is also applicable to fabric reinforcements for the backside of the belts, for flat belts, dual-sided toothed belts, and also for multi-V-ribbed belts and V-belts. It is also applicable to belts built inverted on the mandrel with a fabric layer resulting on the backside of the finished belt. It is also applicable to helical-toothed belts, having transverse teeth that are at an angle other than perpendicular to the sides of the belt, and/or also applicable to toothed belts with teeth that are not straight, but curved. It is also applicable to any other shaped tooth or toothed belt such as helical teeth, teeth in a herringbone design, or oblique and offset teeth, or the like.

Although the present invention and its advantages have been described in detail, it should be understood that various changes, substitutions, and alterations can be made herein without departing from the scope of the invention as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps. The invention disclosed herein may suitably be practiced in the absence of any element that is not specifically disclosed herein.

What is claimed is:

1. A toothed endless belt comprising:
an elastomeric belt body with a plurality of teeth defining a toothed surface of said belt;
a helically wrapped fabric strip having a width and covering the toothed surface with adjacent edges of the fabric strip overlapping one another one-half the width of said fabric strip and describing a helical seam, with said seam extending over more than two teeth, and wherein said seam defines a first helix angle relative to a side edge of the belt; and
a helically wrapped tensile cord embedded in the belt body with the tensile cord describing a second helix angle relative to the side edge of the belt, wherein all the cord centers viewed in a belt cross section are collinear.

2. The belt of claim 1 wherein the width of the fabric strip is equal to or greater than the width of the belt.

3. The belt of claim 1 wherein said seam extends over more than four teeth.

4. The belt of claim 1 wherein said seam extends at least one fourth of the circumference of the belt and no more than once around the circumference of the belt.

5. The belt of claim 1 wherein the first helix angle is greater than the second helix angle.

6. The belt of claim 5 wherein the first helix angle is greater than the second helix angle by a factor of more than two.

7. The belt of claim 6 wherein the first helix angle is in the range of about 1.5 degrees to about 20 degrees.

8. The belt of claim 1 wherein the fabric is a semi-stretch fabric.

9. The belt of claim 1 wherein said seam extends from one side of the belt to the other side of the belt.

10. A method of making a toothed endless belt having an elastomeric belt body with a plurality of teeth defining a toothed surface of said belt comprising:
(a) helically wrapping a fabric strip of predetermined width on a grooved mandrel at a first helix angle with adjacent edges of the fabric strip overlapping one another one-half the width of said fabric strip and describing a helical seam; with said seam extending over more than two teeth; and
(b) helically winding a tensile cord onto said mandrel over said fabric at a second helix angle such that all the cord centers viewed in a belt cross section are collinear;
(c) wrapping a sheet of elastomer material around said mandrel over said tensile cord; and
(d) curing said elastomer material.

11. The method of claim 10 wherein said second helix angle is less than said first helix angle.

12. The method of claim 10 wherein said mandrel has a groove profile; the method further comprising preforming said fabric strip into a corrugated shape to fit the groove profile of said mandrel.

13. The method of claim 12 wherein the preforming results in the fabric strip having teeth corrugations oriented at a tooth angle with respect to an edge of the fabric strip, and said tooth angle is complementary to said first helix angle.

14. The method of claim 12 wherein the preforming includes filling the tooth portions of the fabric strip with an elastomeric tooth material.

15. The method of claim 10 wherein said curing includes heating said elastomer materials under pressure to form a belt sleeve with teeth; and the method further comprises cutting said sleeve to form a plurality of endless toothed belts having a width.

16. The method of claim 15 wherein the predetermined width of the fabric strip is greater than the width of the belts.

17. The method of claim 15 wherein the predetermined width of the fabric strip is from one to four times the width of the belts.

18. A toothed endless belt comprising:
an elastomeric belt body with a plurality of teeth defining a toothed surface of said belt;
a helically wrapped tensile cord embedded in the belt body; and
a helically wrapped fabric strip covering the toothed surface with said fabric strip overlapping itself by one-half the width of said fabric strip, describing a helical seam extending from one side of the belt to the other side of the belt;
with said seam extending over more than two teeth;
wherein all the cord centers viewed in a belt cross section are collinear.

* * * * *